United States Patent
Bly, Jr.

(10) Patent No.: US 9,762,338 B2
(45) Date of Patent: Sep. 12, 2017

(54) EMERGENCY RESPONDER SYSTEMS

(71) Applicant: EchoStar Technologies L.L.C., Englewood, CO (US)

(72) Inventor: Allan Richard Bly, Jr., Marietta, GA (US)

(73) Assignee: EchoStar Technologies L.L.C., Englewood, CO (US)

( * ) Notice: Subject to any disclaimer, the term of this patent is extended or adjusted under 35 U.S.C. 154(b) by 337 days.

(21) Appl. No.: 14/188,365

(22) Filed: Feb. 24, 2014

(65) Prior Publication Data
US 2015/0244480 A1    Aug. 27, 2015

(51) Int. Cl.
| | |
|---|---|
| H04B 7/00 | (2006.01) |
| H04H 20/59 | (2008.01) |
| H04W 4/22 | (2009.01) |
| H04W 40/02 | (2009.01) |
| H04H 20/02 | (2008.01) |
| H04H 20/63 | (2008.01) |

(52) U.S. Cl.
CPC ............ *H04H 20/59* (2013.01); *H04H 20/02* (2013.01); *H04H 20/63* (2013.01); *H04W 4/22* (2013.01); *H04W 40/02* (2013.01)

(58) Field of Classification Search
USPC ........................................................ 455/521
See application file for complete search history.

(56) References Cited

U.S. PATENT DOCUMENTS

| | | | |
|---|---|---|---|
| 6,665,521 B1 * | 12/2003 | Gorday .................. | H04B 7/022 340/7.2 |
| 2007/0218868 A1 * | 9/2007 | Schefczik ............... | H04W 4/22 455/404.1 |

\* cited by examiner

*Primary Examiner* — Ankur Jain
(74) *Attorney, Agent, or Firm* — Kilpatrick Townsend & Stockton LLP

(57) ABSTRACT

Systems for aiding emergency responders are described. An exemplary system may include a primary device and a secondary device. The primary device may be configured to provide audio communication between the primary device and one or more of the plurality of secondary devices along a wireless communication path. The primary device may be configured to compress audio communication for transmission over a low bitrate band. The plurality of secondary devices may be configured as a network where each of the devices is configured to communicate with at least two other secondary devices. The secondary devices may also be configured to receive audio communication from the primary device and automatically transmit the received audio communication to one or more other of the secondary devices.

13 Claims, 6 Drawing Sheets

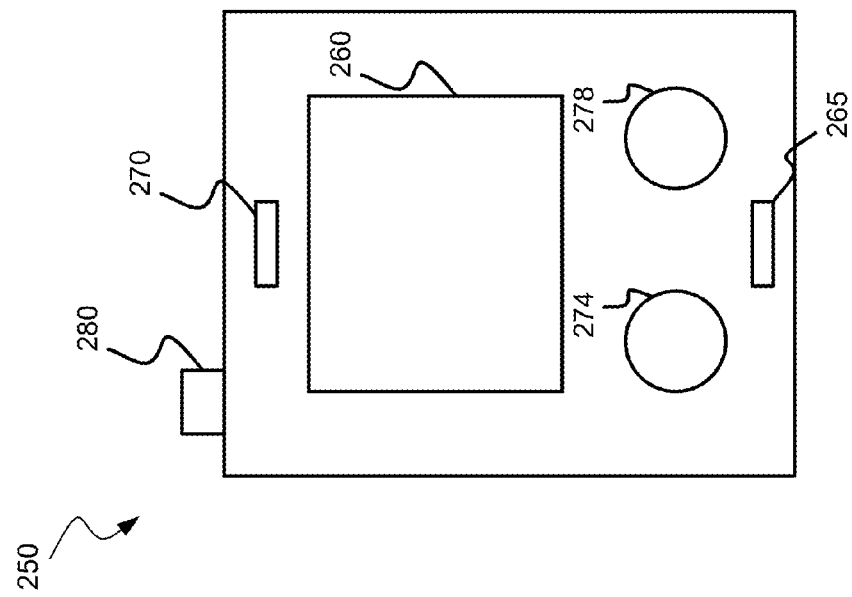
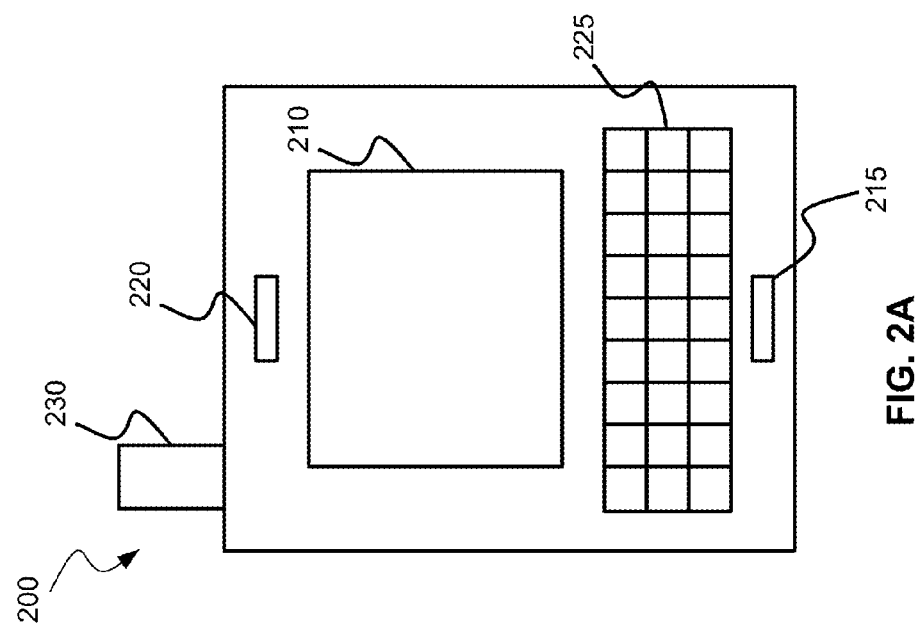

EMERGENCY RESPONDER SYSTEMS

TECHNICAL FIELD

The present technology relates to systems and methods for providing building management information. More specifically, the present technology relates to networks for providing information to and between first responders and building occupants.

BACKGROUND

In emergency response situations, the amount of information provided to or available for first responders may directly affect the time it takes to deliver aid and the extent of aid they may provide. For example, if responders are able to locate occupants more quickly, they may more quickly remove them from a dangerous situation or provide needed help. However, many buildings or structures are ill equipped to provide immediate and updatable information to first response teams attempting to assess an emergency situation. This may result in delays until help may be provided to occupants for the safety of both the occupants and the responders.

Thus, there is a need for improved methods and systems for providing real-time and updatable information to first responders in order to allow improved and more timely aid to be delivered. These and other needs are addressed by the present technology.

SUMMARY

Systems and methods for aiding emergency responders are described. An exemplary system may include a primary device and a secondary device. The primary device may be configured to provide audio communication between the primary device and one or more of the plurality of secondary devices along a wireless communication path. The primary device may be configured to compress audio communication for transmission over a low bitrate band, and may be configured to operate with transmission rates below 256 kB/s, or 64 kB/s in disclosed embodiments. The plurality of secondary devices may be configured as a network where each of the devices is configured to communicate with at least two other secondary devices. The secondary devices may also be configured to receive audio communications from the primary device and automatically transmit the received audio communication to one or more other of the secondary devices.

The plurality of secondary devices within the system may be configured to operate on individual power sources separate from one another. Each of the plurality of secondary devices may also be configured to determine whether a communication path is available between itself and a second of the plurality of secondary devices prior to transmitting received audio communications. In disclosed embodiments, each of the plurality of secondary devices may also be configured such that if one of the secondary devices determines that a communication path is not available between itself and the second of the plurality of secondary devices, the one of the secondary devices may be configured to determine a communication path is available with a third of the plurality of secondary devices. Each of the plurality of secondary devices may also be configured such that if one of the secondary devices determines that a communication path is not available between itself and a second of the plurality of secondary devices, the one of the secondary devices is configured to transmit a response to the primary device that the communication path does not exist or is compromised.

The plurality of secondary devices may each be configured to receive audio communications at a first frequency and transmit audio communications at a second frequency different from the first frequency. Each of the plurality of secondary devices may also be configured to provide two-way audio communication with the primary device. Each of the plurality of secondary devices may also be configured to collect additional data that may include one or more data types selected from the group consisting of occupancy data, temperature data, and chemical data. Each of the plurality of secondary devices may also be configured to automatically provide the additional data to the primary device, and the primary device may be configured to collect the additional data to produce a composite safe route map. Each of the plurality of secondary devices may also include one or more functions or components including an audio alarm, an occupancy sensor, audio detection, a panic button, temperature detection, smoke detection, and chemical detection.

Methods of operating emergency response systems are also described, and may include receiving audio communication from a primary device at a secondary device communicatively coupled with at least one additional secondary device. The methods may include broadcasting the audio communication at the secondary device, and may also include automatically transmitting the audio communication to the at least one additional secondary device. In disclosed embodiments the audio communication may be received and transmitted over a low bit rate wireless band configured to operate at 256 kB/s or less. The secondary device may also be configured to receive audio communication at a first frequency and transmit audio communication at a second frequency different from the first frequency. The methods may also include determining with the secondary device whether a communication path exists between itself and the at least one additional secondary device prior to automatically transmitting the audio communication. If the secondary device determines that the communication path is compromised, the method may also include that the secondary device determines whether another communication path exists with an alternate additional secondary device. If the secondary device determines that the communication path is compromised, the methods may also include that the secondary device transmits reporting information to the primary device about the compromised communication path.

Such technology may provide numerous benefits over conventional techniques. For example, as soon as a first response team arrives at an emergency location, they may begin to create a map based on collected information that may be used to aid entry and/or egress from a building. Additionally, the responders may be able to provide and receive audio communications from occupants of the building regardless of the occupant location. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

FIGS. 2A-2B illustrate exemplary devices in accordance with embodiments of the present technology.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The present technology is directed to systems and methods related to emergency response situations. The technology can allow first responders to quickly assess the severity of an emergency situation, the number of occupants involved in the situation, and to provide information and instructions to occupants. In so doing, aid to occupants may be delivered more rapidly, and the aid provided may be more informed, which may allow for safer entry and extraction from an emergency situation. These and other benefits will be explained in detail below.

Figure 1:
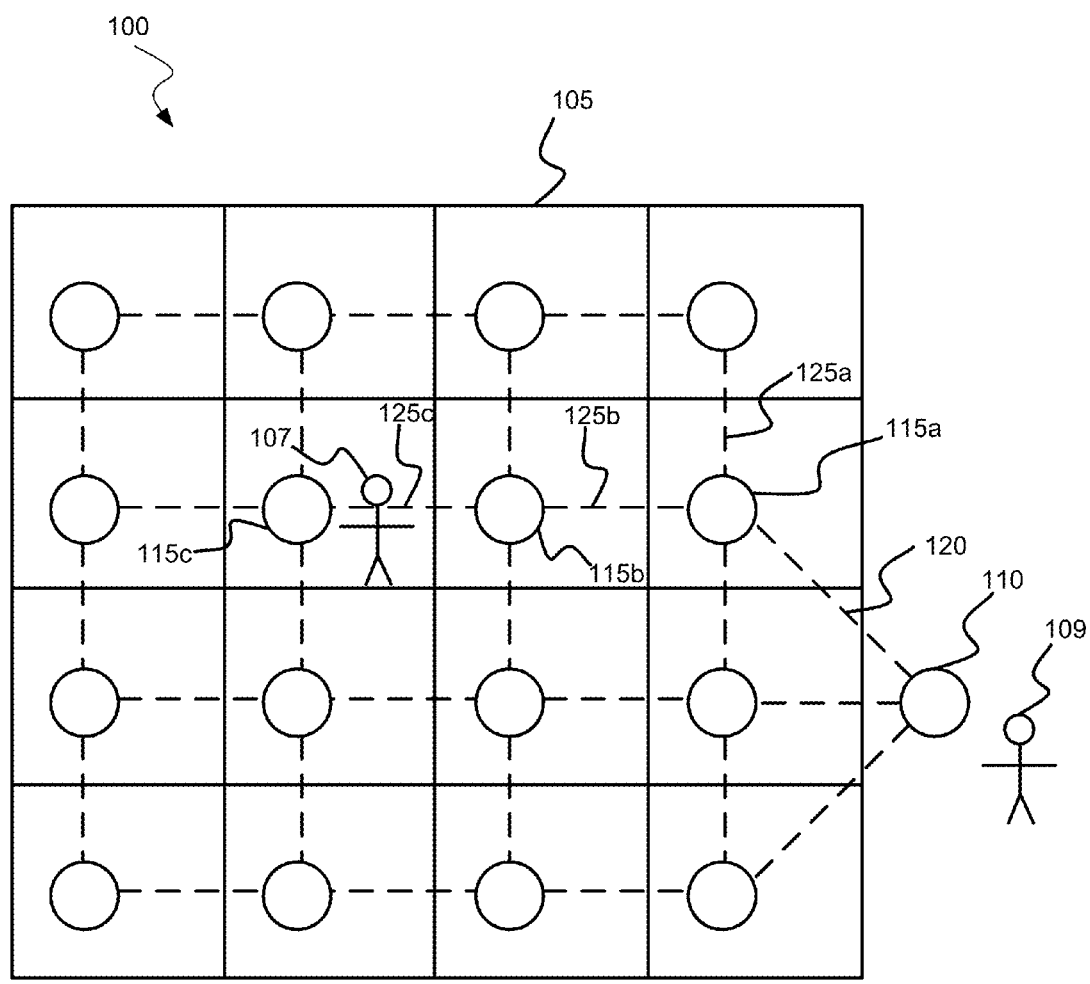
FIG. 1 shows a simplified structure and communication system in accordance with embodiments of the present technology.

FIG. 1 is a simplified illustration of an embodiment of an implemented emergency response system 100. System 100 may be distributed about a building 105, and be utilized to provide information to and between building occupants 107 and emergency responders 109. The system may include a primary device 110 which may be a central controller or master controller in disclosed embodiments. Primary device 110 may take a variety of forms and be located in numerous positions. For example, primary device 110 may be located at building 105, such as at a security desk, or with an exterior location to building 105 such as at an entrance. Primary device 110 may also be maintained by first responders 109 and brought with them to building 105 in an emergency situation. Although FIG. 1 shows a single primary device 110, it is to be understood that any number of primary devices 110 may be included with the system such as maintained by various first responders 109, located at multiple entrances about building 105, etc. in order to provide system redundancy.

System 100 may also include a plurality of secondary devices 115 distributed about building 105. The distribution of secondary devices 115 may be premised on a number of circumstances, and secondary devices 115 may be distributed at, within, or proximate rooms or offices about building 105, or may be positioned at discrete locations throughout each floor of building 105, within stairwells, elevators, or in any other number of locations that may be useful for providing information to occupants 107 as described in further detail below.

Primary device 110 may be configured to provide audio communication between the primary device 110 and one or more of the plurality of secondary devices 115 along wireless communication path 120. Primary device 110 may be communicatively coupled along communication path 120 with one, multiple, or all secondary devices 115 distributed about building 105. For example, in disclosed embodiments every device 110 may simply transmit on a first frequency to any available secondary device 115, and as soon as any secondary device 115 receives the transmitted message, that secondary device may begin forwarding the message amongst the other secondary devices and building 105. The plurality of secondary devices 115 may be configured as a network, such as a wired or wireless network, and each of the plurality of secondary devices may be configured to communicate with at least two other secondary devices 115 along communication path 125. Each of the plurality of secondary devices may also be configured to receive audio communication from the primary device 110 and automatically transmit the received audio communication to one or more other of the plurality of secondary devices 115. Communication paths 120, 125 amongst the primary and secondary devices may be wired or wireless in disclosed embodiments and may be configured for low bit rate transmissions between devices. For example, primary device 110 may be configured to compress audio communication for transmission over a low bitrate band, such as operational transmission rates at, about, or below 256 kB/s, 128 kB/s, 64 kB/s, etc. or less.

Each of the plurality of secondary devices 115 may be configured to operate on individual power sources separate from one another, which may include battery power at each unit. The battery power may be utilized as a backup to system power which may be provided from the building 105 power transmission lines or AC wiring, or the units may have power wholly independent from the electricity system of building 105.

As illustrated in FIG. 1, the plurality of secondary devices 115 may be configured as a network that provides multiple communication pathways 125 between secondary devices 115. For example, secondary device 115a may include communication paths between multiple other secondary devices along different communication paths, such as communication paths 125a and 125b as illustrated. Such a configuration may provide numerous benefits to both system power and operation. For example, by communicatively connecting each secondary device to one or more other secondary devices in relatively proximate location, communications from primary device 110 may be transmitted across longer distances throughout building 105 at reduced power, because each secondary device 115 need only transmit each communication a relatively short distance. For example, if emergency responder 109 is tempting to communicate with building occupant 107, an audio transmission may be passed from primary device 110 either directly to secondary device 115c, depending on the location of that secondary device, or to an alternate secondary device, such a secondary device 115a, that is in close proximity to primary device 110. Secondary device 115a may then relay the response to secondary device 115c via secondary device 115b, along secondary communication paths 125b and 125c. Any number of alternative relay distributions may be understood from this example that are encompassed by the present technology, and may include situations in which particular nodes or secondary devices are compromised, which will be explained in further detail with respect to FIG. 3 below.

Each of the plurality of secondary devices 115 may be configured to receive audio communications at a first frequency and transmit audio communication at a second frequency different from the first frequency in disclosed embodiments. By operating in such a fashion, each secondary device may not be required to store an entire audio communication before it begins forwarding the communication to the next secondary device. For example, a certain frequency may only include a certain amount of bit rate, e.g. 256 kB, on that frequency. Accordingly, if each secondary device received and transmitted on the same frequency the secondary device may be required to collect an entire message being received, stop, and then forward the collected message to the next secondary device. In this way each secondary device may need to collect the entire message before passing it on, which may create a large time delay to transmit a message within a building having dozens of floors and hundreds of secondary devices. However, if each secondary device transmits at a second frequency different from the first frequency, then each secondary device can almost immediately begin transmitting a message at the second frequency while it is still being received at the first frequency. In this way, transmission times between first responders and building occupants may be reduced tremendously.

Determining the frequencies at which the secondary devices operate may occur in any number of ways. For example, in disclosed embodiments each secondary device may be configured with two operating frequencies, e.g. frequency A and frequency B. Each secondary device may be configured to monitor both frequencies in order to ensure reception of transmitted messages. In this way, primary device 110 may transmit an audio communication along either frequency A or frequency B, for example frequency A, which may be received by a first secondary device 115. That secondary device may then transmit the message being received on frequency A along frequency B to the next secondary device, which may receive the message on frequency B before transmitting it to the next secondary device on frequency A, etc. In alternative embodiments each controller may be configured at incremental frequencies for broadcast and reception, or an algorithm can be used, such as via a primary controller or a match controller with each secondary device, that may collect information about surrounding nodes and then instruct each secondary device at which frequency to receive and at which frequency to transmit.

In disclosed embodiments, depending on the available power and distance between each secondary device and the primary device, each secondary device may be configured to provide two-way audio communication with the primary device. In disclosed embodiments, such two-way communications may also be transmitted along communication paths previously described.

FIG. 2A illustrates an exemplary configuration of a primary controller 200 that may be used in conjunction with system 100 previously described. Primary controller 200 may include a number of devices including a standalone unit located at a building, such as at one or more entrances, or any security desk, and they also be a remote unit maintained by emergency responders as well as an application operated on a mobile device or radio of a first responder. Accordingly, the primary device may or may not include any of the following components or functionalities. Primary controller 200 may include a display 210 on which information is presented, which may include a composite map developed by primary controller 200 based on information received from secondary controllers as explained in detail below. Primary controller 200 may further include a microphone 215 and a speaker 220 for transmitting and receiving audio communications. Primary controller 200 may also include a keypad 225 with which messages or instructions can be typed or entered. Primary controller 200 may also include functionality for monitoring device health of the secondary devices under normal conditions as well as operating as a gateway for responders during an emergency.

Primary controller 200 may also include an antenna or transmission device 230 with which messages may be communicated between the primary controller 200 and one or more secondary devices located within a building. In disclosed embodiments in which primary controller 200 is located at a building at which an emergency is occurring, primary controller 200 may also include cell phone or radio transmission capabilities such that primary controller 200 may automatically reach out to first responders based on information received from secondary controllers. In this way, primary controller 200 may begin transmitting information to first responders prior to their arrival at the building, and this information may be used to coordinate and determine action plans which may be implemented almost immediately upon arriving on scene. This information may include building schematics that may or may not include information collected from secondary devices throughout the building, which may present information regarding the type and extent of the emergency or the location of occupants within the building.

FIG. 2B illustrates an exemplary configuration of a secondary controller 250 that may be used in conjunction with system 100 previously described. Secondary controllers 250 may be located throughout the building in a variety of locations in order to provide and receive information useful to first responders and building occupants. Accordingly, secondary devices 250 may or may not include one or more of the following components functionalities. Secondary device 250 may include a display 260 such as previously described and may be used to provide graphic information to building occupants, which may include route information for exiting the building. Secondary device 250 may also include a microphone 265 and a speaker 270 that may be used for transmitting and receiving various messages from building occupants and first responders. Secondary device 250 may include one or more input methods such as buttons 274, 278 that may be used by building occupants for a variety of uses. For example, the buttons may be used for intercom functionality, and they also may operate as panic buttons in emergencies. Secondary device 250 may also include a light 280 such as a strobe light that can be used to generally identify an emergency, or as a light that can be used to identify a safe route or path through the building. Additionally, secondary device 250 may include coloring to stand out, such as red, which may be used to identify the secondary device as an emergency device. Secondary device 250 may also include recording capabilities which may be utilized to provide forensic analysis subsequent to an emergency. For example, secondary device 250 may include storage capabilities for logging sensor readings as well as recording conversations received by the secondary device.

Secondary device 250 may also include a number of additional functionalities not illustrated that may be useful in emergency situations. For example each secondary device may be configured to collect additional information including video data, occupancy data, temperature data, or chemical data that may all be transmitted to a primary controller for emergency responders. In disclosed embodiments, the secondary devices may be configured to automatically provide the additional data or information to the primary device in an emergency or when preprogrammed thresholds are met. For example, secondary devices may include additional devices including an audio alarm, an occupancy sensor, a camera or video recorder, a microphone or audio detector, a panic button, a thermometer or temperature detection device, a smoke detector, or one or more chemical detectors. As would be understood, the detectors may take any number of forms and may include one or more detectors that may include optical-based detectors, such as for a smoke detector, ionization-based detection, air sampling detection, optochemical detection, biomimetic, electrochemical, or semiconductor-based detectors in disclosed embodiments. The detectors may be used not only for smoke or carbon monoxide detection, but also for other chemical detection, such as in buildings or factories in which toxic or otherwise harmful chemicals may be produced.

As previously noted, secondary devices may be configured to automatically provide any additionally collected data to a primary device during an emergency, or during normal operation. For example, each secondary device may include carbon monoxide detection functionality, and during normal operation a secondary device may detect carbon monoxide levels above a preprogrammed threshold. The secondary device may then transmit to a primary controller that a threshold has been surpassed. The primary controller may then query information from other secondary devices located proximate to the secondary device delivering the initial message to determine whether an emergency situation may be occurring, or whether there may be a malfunction with a secondary device. Based on the information provided from multiple secondary devices, a primary controller may be able to determine relative boundaries of an emergency and produce a composite safe route map through the building that avoids the potential emergency area. Such an exemplary emergency situation is further described with respect to FIG. 3 below.

Figure 3:
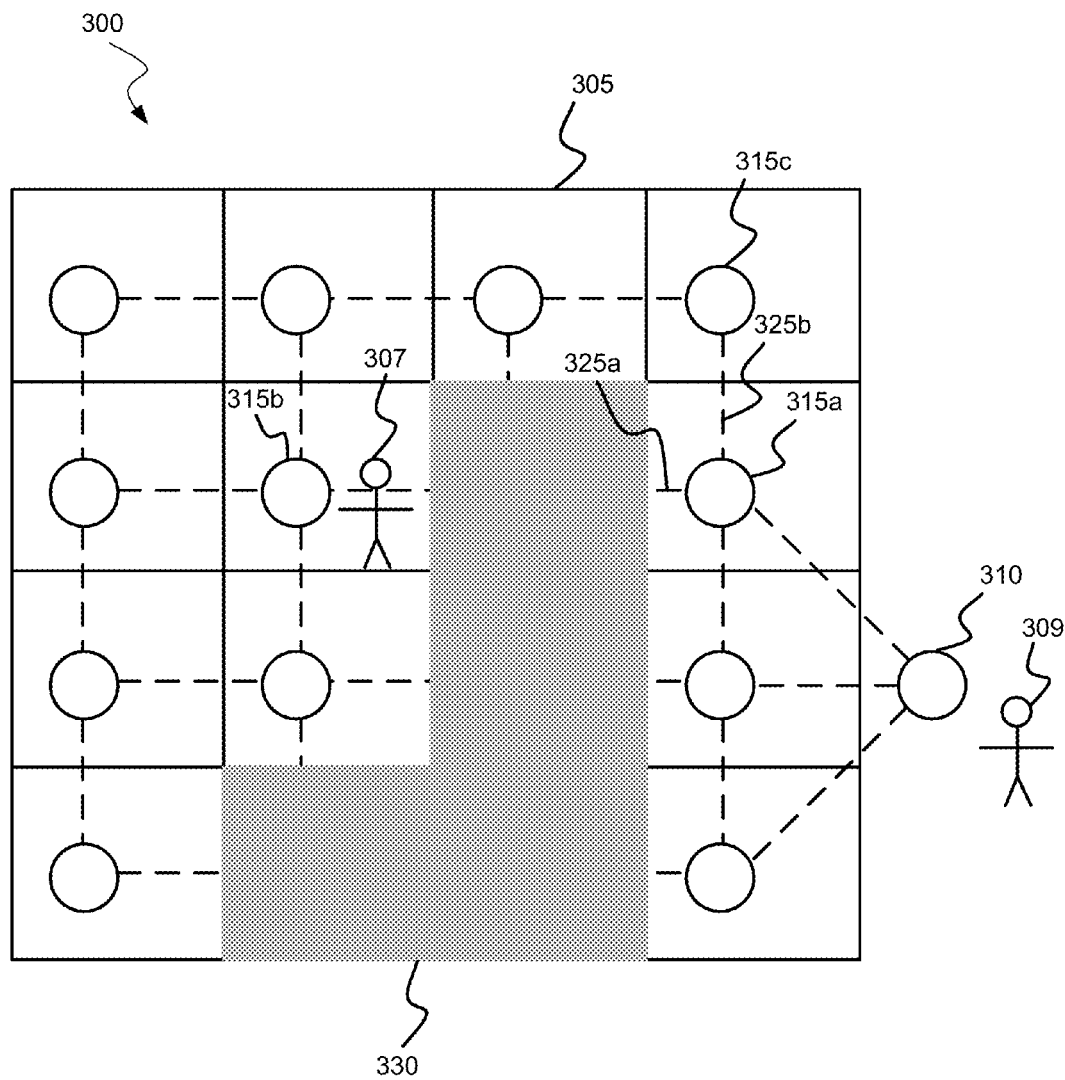
FIG. 3 shows a simplified structure and communication system in accordance with embodiments of the present technology.

FIG. 3 is a simplified illustration of an embodiment of an implemented emergency response system 300. System 300 may include any of the components as previously described with system 100, and may include a building 305 in which an emergency is occurring. System 300 may include a plurality of secondary devices 315 distributed throughout the building 305 configured as a network for aiding emergency responders 309 attempting to communicate with a building occupant 307. Any number of emergencies may be encompassed by the present technology and may include, for example, a fire present in region 330 of building 305 that may have compromised a number of secondary devices as well as their communication paths. Emergency responder 309 may utilize primary device 310 to communicate into building 305 via secondary devices 315.

During operation, each of the plurality of secondary devices 315 may be configured to determine whether a communication path is available between itself and a second of the plurality of secondary devices prior to transmitting received audio communication. For example, secondary device 315a may receive an audio communication from first responder 309 by a primary device 310. The emergency responder 309, may be attempting to communicate with building occupant 307 located near secondary device 315b. Secondary device 315a may attempt to relay a message to secondary device 315b via an intermediate secondary device located in region 330, by communication path 325a. However, secondary device 315a may determine the intermediate secondary device and/or communication path 325a has been compromised by the fire present in region 330. Secondary device 315a may then determine that a communication path is not available between itself and the intermediate secondary device located in region 330.

Secondary device 315a may then determine whether an alternate secondary device is available for communication. Secondary device 315a may then transmit the received message by communication path 325b to secondary device 315c, which may then utilize additional secondary devices 315 to transmit the message to secondary device 315b and building occupant 307. Such a process, and any number of variations encompassed by the present technology, may further be utilized to determine the boundaries of an emergency, such as the fire occurring in region 330. Each of the plurality of secondary devices 315 may also be configured such that if a secondary device determines that a communication path is not available between itself and another of the plurality of secondary devices, then the secondary device may transmit a response to the primary device 310 that the communication path does not exist. This information may then be utilized by primary device 310 and emergency responders 309 to create a composite map of building 305 identifying the emergency region 330. This may also allow primary device 310 and emergency responder 309 to produce a composite map of building 305 in which a safe route may be developed by which occupant 307 may exit the building during the emergency. Additionally, based on additional data collected at secondary devices 315, regardless of the availability of communication paths, information such as temperature may help inform the safe route mapping for moving building occupants. These scenarios are described in further detail with the operations discussed with regard to FIGS. 4-5 below.

Figure 4:
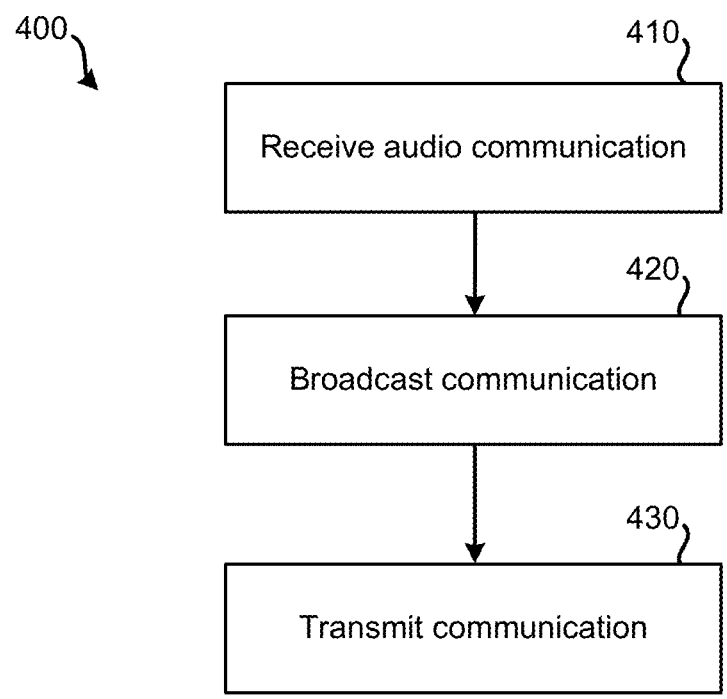
FIG. 4 shows a simplified flow diagram of a method of operating an emergency response system according to embodiments of the present technology.

The systems and devices previously described may be used in performing various methods. FIG. 4 illustrates an embodiment of a method 400 for operating an emergency response system. Method 400 may be performed using any of the systems or components previously described. Method 400 may allow for a device to receive and provide communications throughout a building. Each step of method 400 may be performed at or by a single electronic device, such as a secondary device as previously described, for example, or by multiple devices communicating with one another. Means for performing each step of method 400 include an electronic device and/or the various components of an electronic device or distribution system, such as those detailed in relation to FIGS. 1-3. Method 400 may be performed using a computerized device, such as a device incorporating some or all of the components of computer system 600 of FIG. 6.

At operation 410, a secondary device may receive a communication from a primary device. The communication may be an audio communication, and may be in either in an analog, e.g., baseband, AM, FM, or digital, e.g. digitized and compressed audio, format. The communication may also be a control and status information communication, which may or may not include audio. The secondary device may also be communicatively coupled with at least one additional secondary device. The secondary device may broadcast the audio communication at the secondary device, such as through a speaker, at operation 420. The secondary device may also automatically forward the communication to the at least one additional secondary device at operation 430 either before, during, or after the broadcast. The secondary device may be configured to operate on a low bit rate wireless band, and may be configured to receive and transmit at rates of 256 kB/s or less. The secondary device may also be configured to receive audio communication at a first frequency and transmit audio communication at a second frequency different from the first frequency as previously described.

The types of communications being received, transmitted, or forwarded may include both messages and signals that may be audio in nature. For example, a primary device may receive an audio signal from a first responder asking for identification of individuals in an environment. The primary device may digitize and/or compress the audio signal into an audio message, and then transmit the audio message to one or more secondary devices. The secondary device may receive and decode the audio message and convert it to an audio signal to be output to a local speaker at the secondary device. Previously, subsequently, or simultaneously the secondary device may also forward the audio message to one or more other secondary devices in the vicinity. Additionally, a first responder may provide an input on a primary device to produce an alarm status from a secondary device. The primary device may transmit the status command to one or more secondary devices. The secondary device may receive the alarm status command and send its alarm status back to the primary device, while simultaneously or subsequently forwarding the alarm status command to one or more other secondary devices in the vicinity.

The secondary device may also provide additional functionality based on information received from the primary device. For example, in buildings with multiple secondary devices, and during an emergency situation such as the fire described with respect to FIG. 3, a primary device may provide an instruction to one or more secondary devices to enable a light or sound that may be used to guide building occupants outside of the building, and around potential emergency zones.

The primary and secondary devices may be operated in a number of ways to locate building occupants. For example, a primary controller can broadcast a message to all intercoms either in succession or all at once, and may be used to instruct building occupants to identify their location. Building occupants can then toggle inputs on any of the secondary devices, or merely call out toward the secondary device. For example, a message from first responders may instruct any building occupants to request help or interact with the secondary device in any number of ways including by calling for help over a period of time. The primary controller can then scan through the secondary controllers over a period of time to determine the location of occupants. For example each secondary device may be instructed to record for a period of a few seconds or less and transmit the recording back to the primary controller. The recordings may be used by the primary controller and first responders to determine the location of building occupants, and they also may be used to determine the location of an emergency based on other recorded sounds.

Figure 5:
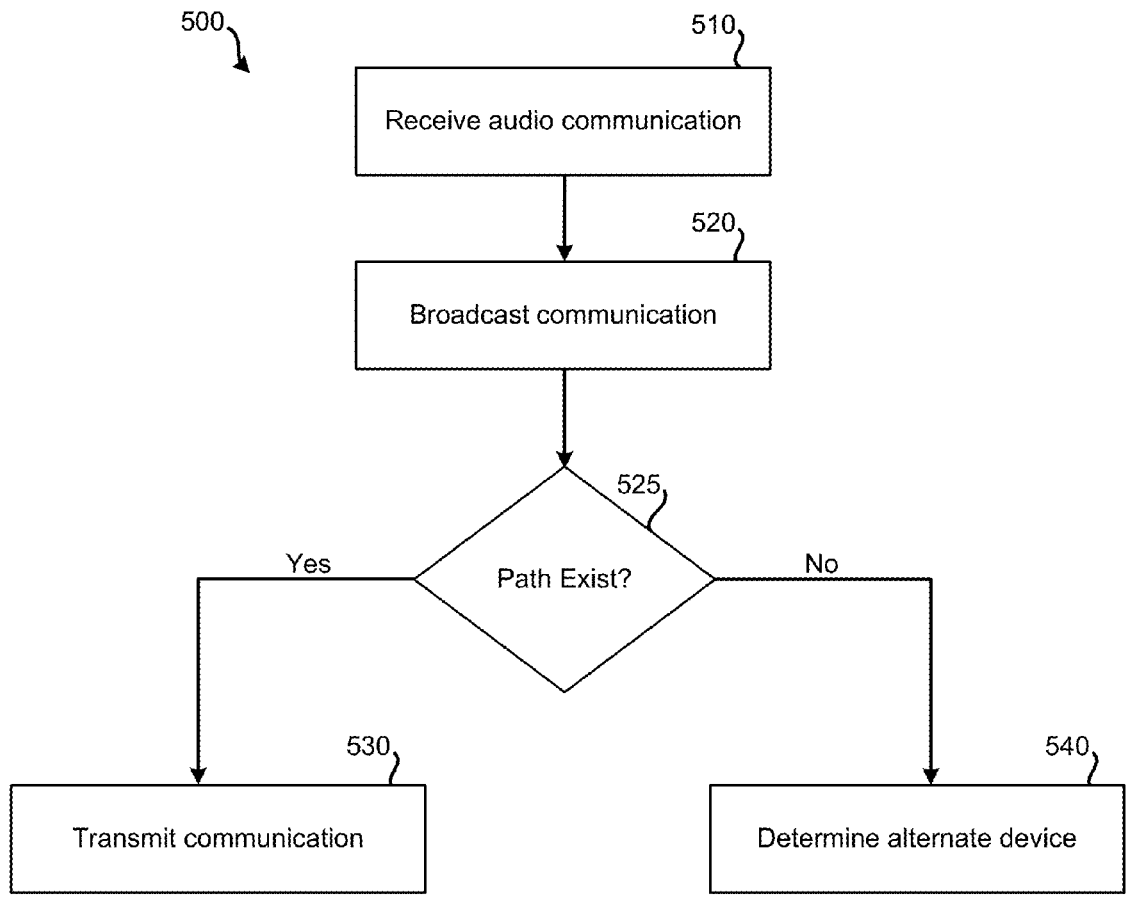
FIG. 5 shows another simplified flow diagram of a method of operating an emergency response system according to embodiments of the present technology.

FIG. 5 illustrates another embodiment of a method 500 for operating an emergency response system. Method 500 may be performed using any of the systems or components previously described. Method 500 may allow for a device to receive and provide communications throughout a building. Each step of method 500 may be performed by an electronic device, such as the previously described secondary devices, or may be performed with more than one device in communication with one another. Means for performing each step of method 500 include a first and/or second electronic device and/or the various components of an electronic device or distribution system, such as those detailed in relation to FIGS. 1-3. Method 500 may represent a more detailed embodiment of method 400, or an alternative embodiment to method 400. Method 500 may be performed using a computerized device, such as a device incorporating some or all of the components of computer system 600 of FIG. 6.

At operation 510, a secondary device may receive a communication from a primary device. The secondary device may also be communicatively coupled with at least one additional secondary device. The secondary device may broadcast the communication at the secondary device, such as through a speaker, at operation 520. The secondary device may then determine whether a communication path exists between itself and at least one additional secondary device at operation 525. If the secondary device does determine that a valid communication path exists, the secondary device may automatically transmit the audio communication at operation 530. Additionally, if the secondary device determines that the communication path is compromised, the secondary device may determine whether another communication path exists with an alternate additional secondary device at operation 540. The secondary device may also transmit reporting information to the primary device about a compromised communication path in disclosed embodiments. Various other operations in line with the numerous examples described herein are also encompassed by the present technology as would be generally understood.

Figure 6:
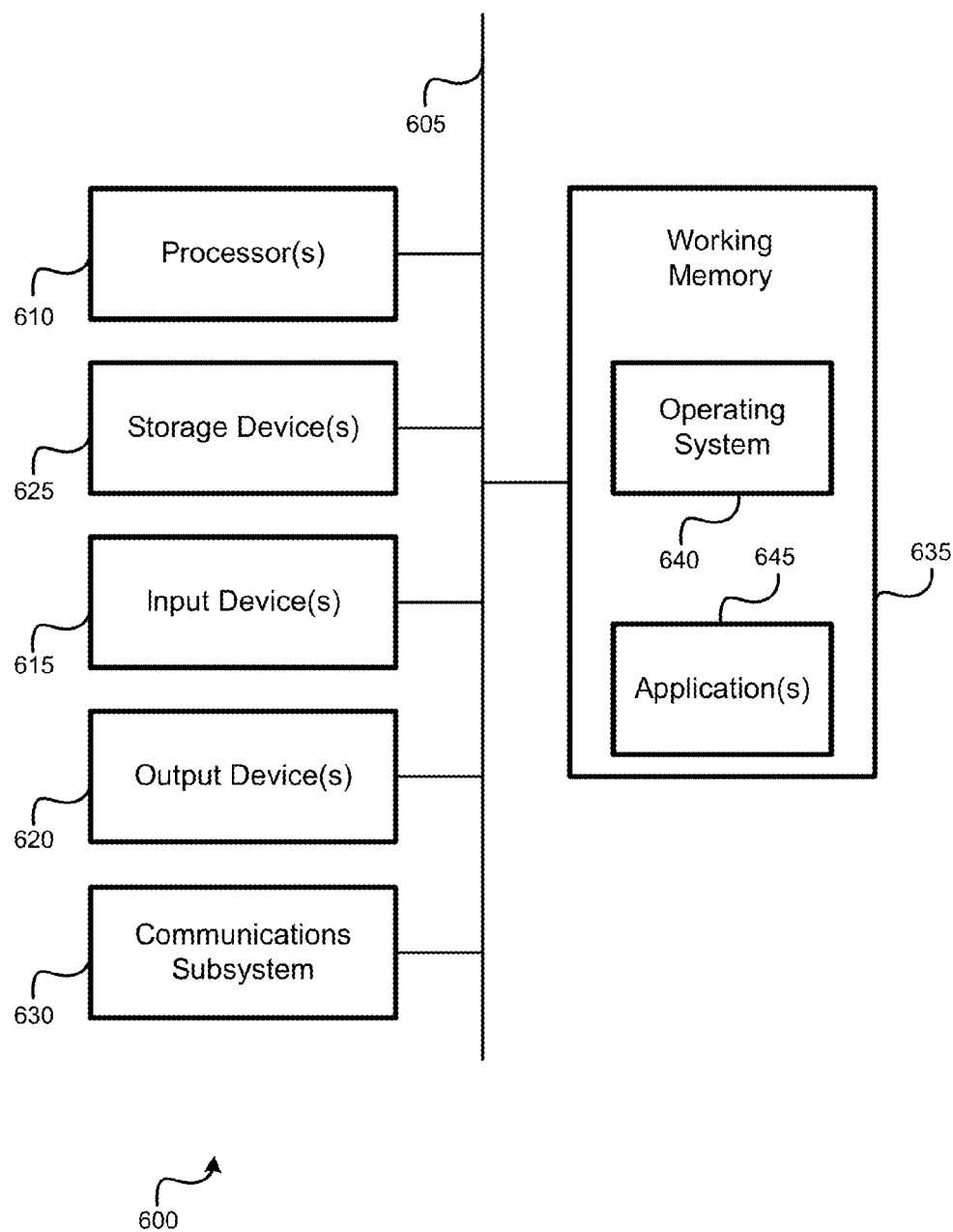
FIG. 6 shows a simplified computer system that may be utilized to perform one or more of the operations discussed.

FIG. 6 illustrates an embodiment of a computer system 600. A computer system 600 as illustrated in FIG. 6 may be incorporated into devices such as a primary device or secondary device as previously described. Moreover, some or all of the components of the computer system 600 may also be incorporated into a portable electronic device, mobile phone, or other device as described herein. FIG. 6 provides a schematic illustration of one embodiment of a computer system 600 that can perform some or all of the steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605, or may otherwise be in communication, as appropriate. The hardware elements may include one or more processors 610, including without limitation one or more general-purpose processors and/or one or more special-purpose processors such as digital signal processing chips, graphics acceleration processors, and/or the like; one or more input devices 615, which can include without limitation a mouse, a keyboard, a camera, and/or the like; and one or more output devices 620, which can include without limitation a display device, a printer, and/or the like.

The computer system 600 may further include and/or be in communication with one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 630 may include one or more input and/or output communication interfaces to permit data to be exchanged with a network such as the network described below to name one example, other computer systems, and/or any other devices described herein. Depending on the desired functionality and/or other implementation concerns, a portable electronic device or similar device may communicate image and/or other information via the communications subsystem 630. In other embodiments, a portable electronic device, e.g. the first electronic device, may be incorporated into the computer system 600, e.g., an electronic device, as an input device 615. In many embodiments, the computer system 600 will further comprise a working memory 635, which can include a RAM or ROM device, as described above.

The computer system 600 also can include software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIGS. 4 and 5, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 600 to perform methods in accordance with various embodiments of the technology. According to a set of embodiments, some or all of the procedures of such methods are performed by the computer system 600 in response to processor 610 executing one or more sequences of one or more instructions, which might be incorporated into the operating system 640 and/or other code, such as an application program 645, contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 and/or components thereof generally will receive signals, and the bus 605 then might carry the signals and/or the data, instructions, etc. carried by the signals to the working memory 635, from which the processor(s) 610 retrieves and executes the instructions. The instructions received by the working memory 635 may optionally be stored on a non-transitory storage device 825 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

Where a range of values is provided, it is understood that each intervening value, to the smallest fraction of the unit of the lower limit, unless the context clearly dictates otherwise, between the upper and lower limits of that range is also specifically disclosed. Each smaller range between any stated value or intervening value in a stated range and any other stated or intervening value in that stated range is encompassed. The upper and lower limits of those smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. An emergency responder system comprising:
a primary device; and
a plurality of secondary devices, wherein:
the primary device is configured to provide audio communication between the primary device and one or more of the plurality of secondary devices along a wireless communication path,
the primary device is configured to compress audio communication for transmission over a low bitrate band,
the plurality of secondary devices are configured as a network within or about a building or structure wherein each of the plurality of secondary devices is communicatively wired with at least two other secondary devices on a separate and individually wired communication path,
each secondary device sends environmental information determined at the secondary device from the secondary device to the primary device,
each secondary device receives an instruction from the primary device whether to engage a light coupled with the secondary device to provide a lighted route identifying a pathway between the plurality of secondary devices,
each secondary device of the plurality of secondary devices is configured to determine whether the wired communication path is available between itself and at least one of the at least two other secondary devices prior to transmitting received audio communication,
each of the plurality of secondary devices is configured to determine when the wired communication path is not available between itself and another of the plurality of secondary devices and transmit a response to the primary device that the wired communication path does not exist, and
the plurality of secondary devices are configured to receive audio communication from the primary device and automatically transmit the received audio communication to one or more other of the plurality of secondary devices.

2. The emergency responder system of claim 1, wherein the system is configured to operate with transmission rates below 256 kB/s.

3. The emergency responder system of claim 2, wherein the system is configured to operate with transmission rates below 64 kB/s.

4. The emergency responder system of claim 1, wherein each of the plurality of secondary devices are configured to operate on individual power sources separate from one another.

5. The emergency responder system of claim 1, wherein each of the plurality of secondary devices are configured such that if one of the secondary devices determines that a communication path is not available between itself and a second of the plurality of secondary devices, the one of the secondary devices is configured to determine if a communication path is available with a third of the plurality of secondary devices.

6. The emergency responder system of claim 1, wherein each secondary device of the plurality of secondary devices is configured to receive audio communications at a first frequency and transmit audio communications to another secondary device at a second frequency different from the first frequency.

7. The emergency responder system of claim 1, wherein each of the plurality of secondary devices is configured to provide two-way audio communication with the primary device.

8. The emergency responder system of claim 1, wherein each secondary device of the plurality of secondary devices is configured to collect additional data about environmental conditions proximate the secondary device.

9. The emergency responder system of claim 8, wherein the additional data includes one or more data types selected from the group consisting of occupancy data, temperature data, and chemical data.

10. The emergency responder system of claim 8, wherein each of the plurality of secondary devices are configured to automatically provide the additional data to the primary device.

11. The emergency responder system of claim 10, wherein the primary device is configured to collect the additional data to produce a composite safe route map, wherein the composite safe route map includes visual identification of each secondary device and visual identification of each secondary device that has not responded or has provided additional data comprising non-standard conditions, and wherein the primary device is configured to display the composite safe route map.

12. The emergency responder system of claim 1, wherein each of the plurality of secondary devices comprise one or more functions selected from the group consisting of an audio alarm, an occupancy sensor, audio detection, a panic button, temperature detection, smoke detection, and chemical detection.

13. The emergency responder system of claim 1, wherein the primary device is configured to send a status request that is transmitted to each secondary device of the plurality of secondary devices via the network, and wherein each secondary device of the plurality of secondary devices is configured to transmit a status update to the primary device in response to receiving the transmitted status request.

* * * * *